Sept. 27, 1955 F. A. MORRIS 2,719,225

PULSE RESPONSIVE CIRCUIT

Filed April 20, 1950

INVENTOR.
Frank A. Morris
BY
T. L. Bowes
Att'y

United States Patent Office 2,719,225

Patented Sept. 27, 1955

2,719,225

PULSE RESPONSIVE CIRCUIT

Frank A. Morris, Rochester, N. Y., assignor, by mesne assignments, to General Dynamics Corporation, a corporation of Delaware Application April 20, 1950, Serial No. 157,085

2 Claims. (Cl. 250—27)

Figure 1:
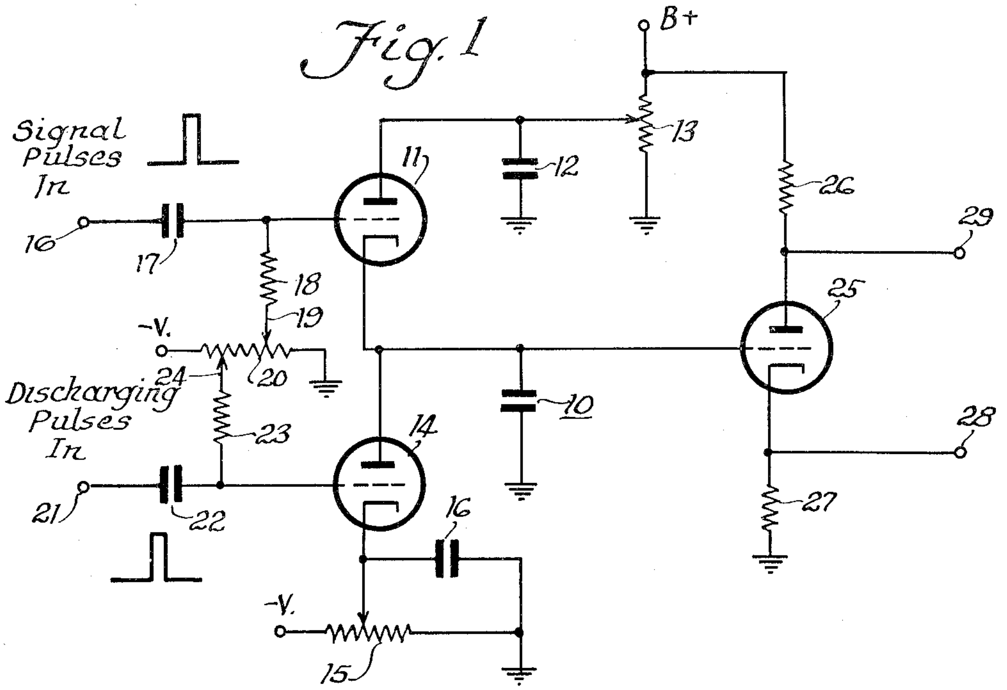

The present invention relates to pulse responsive circuits, and, more particularly, to improved potential clamping facilities for use in pulse responsive circuits to control the charging and discharging of a storage capacitor in response to charging and discharging control pulses. While the invention is of general utility, it is particularly suitable as a demodulator for pulse multiplexing systems and especially in connection with an electronic telephone system of the type disclosed in a co-pending joint application of Frank A. Morris and Robert B. Trousdale, Serial No. 134,974, filed on December 24, 1949, and assigned to the same assignee as the present invention.

In many instances, it is desirable to charge and discharge a capacitor in accordance with pulses occurring in a predetermined sequence and to have the capacitor hold its charge in between the charging and discharging control pulses. Such a requirement is found, for example, in pulse multiplexing systems wherein signal or intelligence bearing pulses may be demodulated by charging the storage capacitor in accordance with the amplitude of the intelligence bearing pulses and discharging the capacitor to a predetermined level immediately preceding each intelligence bearing pulse to provide a stairstep wave form the envelope of which corresponds to the original intelligence. Certain clamping arrangements heretofore proposed have employed a storage capacitor charging and discharging circuit in which the capacitor is never fully discharged but has a minimum clamping level which is at a relatively high potential with respect to ground. In such arrangements, the vacuum tubes used to control the charging and discharging of the storage capacitor must be operated at a high bias potential to obtain complete cut off and prevent discharging of the capacitor between pulses. This means that the charging and discharging control pulses must be amplified to a relatively high level before they are suitable to effect control of the storage capacitor. Further, when the storage capacitor is connected to a cathode follower output stage to provide low impedance for succeeding circuits, the operation of a storage capacitor above a high potential minimum level may cause the cathode follower to draw grid current, thus causing an undesired discharge of the storage capacitor in the periods between the charging and discharging control pulses.

Accordingly, it is an object of the present invention to provide a new and improved clamping circuit suitable for demodulating amplitude modulated control pulses.

It is another object of the present invention to provide a new and improved clamping circuit wherein the clamping point of the storage capacitor may be adjusted over a relatively wide range of potentials.

It is a further object of the present invention to provide a new and improved clamping circuit in which the minimum operating level of the storage capacitor may be made to coincide substantially with ground potential.

It is still another object of the present invention to provide a new and improved clamping circuit of the storage capacitor type which is particularly adapted for use with a cathode follower of relatively low output impedance.

Figure 2:
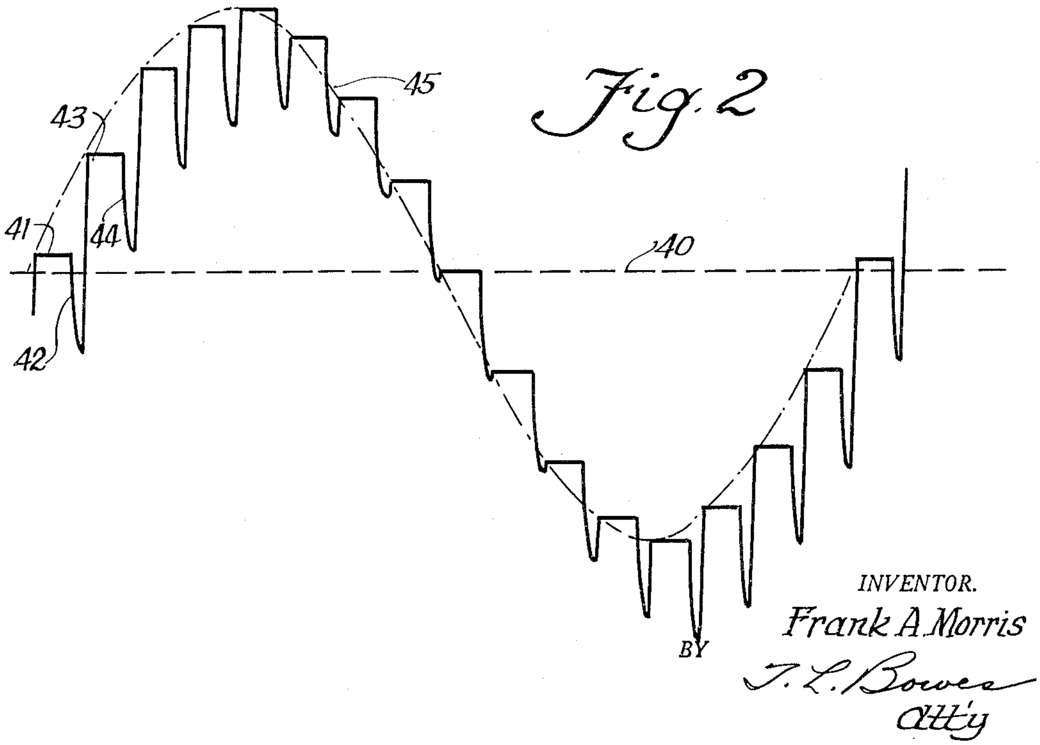

The invention, both as to its organization and method of operation, together with further objects and advantages thereof, will best be understood by reference to the following specification taken in connection with the accompanying drawings, in which:

Fig. 1 is a schematic diagram of a clamping circuit embodying the principles of the present invention; and Fig. 2 is a timing diagram illustrating the wave form produced in the circuit of Fig. 1.

Referring now more particularly to the drawing, there is illustrated in Fig. 1 a clamping circuit constructed in accordance with the principles of the present invention. As shown, the clamping circuit comprises a storage capacitor 10 which is charged from a positive source of unidirectional potential indicated by the legend B+ through an electron discharge device 11. Thus, the cathode of the device 11 is connected to the ungrounded terminal of the storage capacitor 10. The anode of device 11 is connected through a by-pass capacitor 12 to ground and is also connected to the movable arm of a potentiometer 13 which is connected between the B+ supply source and ground. The capacitor is discharged by means of a second electron discharge device 14, the anode of which is connected to the ungrounded terminal of capacitor 10 and is also connected to the cathode of the device 11, the cathode of device 14 being connected to the arm of a potentiometer 15 which is connected between a source of negative potential and ground. A by-pass capacitor 16 is connected from the cathode of device 14 to ground.

To control the conductivities of the devices 11 and 14 and hence to control the charging and discharging periods of the storage capacitor 10, there is provided a first input circuit including the input terminal **16*a* to which are applied signal bearing pulses which are modulated in amplitude in accordance with intelligence signals. The signal bearing pulses are coupled through a capaciltor 17 to the control electrode of the device 11, this control electrode also being connected through a grid leak resistor 18 to one arm 19 of a potentiometer 20. The potentiometer 20 is connected between a negative source of potential and ground so that the control electrode of device 11** may be operated at a negative potential with respect to ground.

To discharge the storage capacitor 10 by a predetermined amount immediately preceding each signal bearing pulse supplied to the terminal **16*a*, there is provided a second input circuit including an input terminal 21 to which is supplied a series of discharging pulses which occur in properly timed relation with respect to the signal bearing pulses to accomplish the above-mentioned discharging action. The discharging pulses are coupled through a capacitor 22 to the control electrode of device 14, the control electrode of this device being connected through a resistor 23 to a second movable arm 24 on the potentiometer 20. With this arrangement the control electrode of device 14 may be operated at a negative potential with respect to ground depending upon the position of the arm 24. In this connection, it will be understood that the potentials at which the control electrodes of the devices 11 and 14 are operated may be widely different, a common bias potentiometer 20 being shown merely for convenience of illustration. It will also be understood that there is no interaction between the input circuits of the devices 11 and 14 through the common potentiometer 20, the impedance of potentiometer 20** being so chosen as to prevent any such interaction.

In order to utilize the voltage produced across the storage capacitor 10, there is provided an output circuit which includes an electron discharge device 25, the control electrode of which is connected to the ungrounded terminal of the storage capacitor 10. The anode of the device 25 is connected through an anode load resistor 26 to the B+ supply and the cathode of device 25 is connected through a cathode load resistor 27 of similar value to ground. An output voltage of the same phase as the voltage produced across the capacitor 10 is thus supplied to the output terminal 28 and an output voltage of opposite phase is supplied to the output terminal 29.

In considering the operation of the above-described clamping circuit, it will be evident that the positive signal bearing pulses applied to the control electrode of the device 11 will cause conduction of this device provided they are of sufficient amplitude to overcome the bias potential between the cathode and the control electrode of device 11. However, inasmuch as the cathode of the device 11 is connected to the capacitor 10, the total grid to cathode bias voltage of device 11 will include the voltage across the capacitor 10 as well as the negative potential at the arm 20 so that the signal bearing pulses must have an amplitude sufficient to overcome both of the above-mentioned voltages before the device 11 will conduct.

Upon conduction of the device 11, the capacitor 10 charges through the device 11 from the positive B+ supply, so that the potential at the ungrounded terminal of the capacitor 10 rises to a value proportional to the amplitude of the incoming signal bearing pulses supplied to the device 11.

The device 11 thus acts as a cathode follower to produce a potential across the capacitor 10 corresponding to the amplitude of the input pulses. At the end of the signal bearing pulse, the storage capacitor remains at its previously charged level until a subsequent discharging pulse, which occurs immediately preceding the next signal bearing pulse, is supplied to the device 14.

When a positive discharging pulse is applied to the control electrode of the device 14, this device conducts and discharges the capacitor by a predetermined amount whereupon the next signal bearing pulse is supplied to the device 11 and charging of the capacitor is again produced. In order to provide a low impedance discharge path for the capacitor 10, the capacitor 16 is preferably large in value so as to shunt out the portion of the potentiometer 15 between the cathode of the device 14 and ground. The capacitor is thus charged through the device 11 in proportion to the amplitude of the signal bearing pulses and is discharged by the application of discharge pulses to the device 14, these discharge pulses having a duration sufficient to discharge the capacitor a predetermined amount. In this connection it will be understood that the capacitor 10 is preferably of relatively small value so as to permit rapid charging and discharging thereof as discussed above.

In considering the clamping level to which the capacitor 10 is discharged by means of the discharging pulses applied to device 14, it is evident the capacitor 10 may only be discharged so long as the device 14 is conducting and hence if the cathode of the device 14 were connected to ground, the minimum clamping level to which the capacitor would be discharged would have a relatively high potential with respect to ground due to the fact that the device 14 requires a minimum anode potential to support conduction therethrough. However, in accordance with an important feature of the present invention, the cathode of device 14 is connected to a negative potential point on the potentiometer 15 so that the minimum potential level to which the capacitor 10 is discharged may be varied over relaively wide limits and may actually be set at ground potential or a negative potential. With this arrangement, the bias voltage of the input circuit of the device 11 is substantially reduced due to the fact that the minimum potential level of the capacitor 10, and hence the cathode voltage of device 11 is substantially reduced. Accordingly, signal input pulses of relatively small amplitude may be utilized to control the charging device 11 due to the relatively low bias voltage requirements thereof.

The above-described operation of the storage capacitor at an average potential level which is at or below ground potential also provides the further advantage of reducing the maximum potential to which the capacitor 10 is charged. Such a reduction in the maximum potential produced across the capacitor 10 means that the cathode resistor 27 of the cathode follower output stage may be chosen with a relatively low value without causing the flow of grid current in the device 25 and the consequent discharging of the capacitor 10 during the intervals between the signal bearing pulses and the discharge pulses. In this connection, it will be understood that if a large resistor 27 were employed in the cathode circuit of the device 25, so as to prevent the flow of grid current during peak potentials acquired by the capacitor 10, the output impedance from the cathode follower stage would be substantially increased during the negative portions of the charging intervals of the capacitor and hence the wave form produced at the output terminal 28 would not be a faithful reproduction of the capacitor voltage. However, by controlling the minimum potential level to which the voltage across the capacitor 10 is clamped, by means of the potentiometer 15, the maximum voltage appearing across the capacitor may be limited so that a relatively small cathode resistor 27 may be employed and a true wave form produced at the output terminals 28 and 29.

By adjusting the potentiometers 13 and 15, the positive potential to which the capacitor is charged and the negative potential to which it is discharged may be varied so as to obtain any desired type of output signal. Thus, for example, if a variably positive voltage is required, the potentiometers 13 and 15 may be so adjusted that the junction point between the devices 11 and 14, and hence the minimum voltage of capacitor 10, is at a positive potential with respect to ground and variations in the capacitor voltage will produce a variable positive voltage at the control electrode of the output device 25. On the other hand, if a variable negative voltage is required, the potentiometers 13 and 15 may be so adjusted that the junction point of the devices 11 and 14 is below ground. Alternatively, the devices may be so adjusted that the average potential level of the capacitor 10 corresponds exactly to ground potential in which case a strictly alternating current output signal is obtained. With such an arrangement, the clamping circuit is particularly adapted for direct coupling to subsequent stages, inasmuch as the D. C. component may be set by means of the potentiometers 13 and 15 to the desired D. C. level.

In order more clearly to visualize the above-described operation of the double triode clamping circuit of Fig. 1, there is shown in Fig. 2 the voltage produced across the storage capacitor 10. Thus, referring to Fig. 2, the capacitor is charged from an average clamping level 40 by an amount equal to the value indicated by the reference numeral 41 in response to a first signal bearing pulse. The capacitor voltage remains at the value 41 until the occurrence of a discharging pulse which immediately precedes the next signal bearing pulse, whereupon the capacitor discharges, as indicated at 42, by a predetermined amount. Immediately following the discharge of the capacitor, a second signal bearing pulse of increased amplitude charges the capacitor to a larger value 43, which value is again maintained until the next succeeding discharging pulse whereupon the capacitor is again discharged a predetermined amount as indicated at 44. The storage capacitor is thus charged by successive signal bearing pulses to a potential proportional to the amplitude of the signal bearing pulses and is discharged by a fixed amount immediately preceding each signal bearing pulse. It is evident from Fig. 2 that the plateaus formed during periods when the capacitor holds its charge at the value of the preceding signal bearing pulse follow the modulation of the signal bearing pulses and hence the envelope of the voltage produced across the capacitor is equal to the original intelligence signal used to amplitude modulate the signal bearing pulses. In Fig. 2 the modulation envelope of the amplitude modulated signal pulses is indicated by the dotted line 45 and is shown as a conventional sinusoidal wave. In this connection it will be understood that the envelope of the capacitor voltage may comprise any intelligence signal such as speech, or the like, the envelope being indicated as a sinusoidal wave merely for convenience of illustration. It will be further understood that the charging and discharging intervals of the storage capacitor are normally a very small percentage of the total time between successive charging pulses, these intervals being accentuated merely for the purposes of clarifying the charging and discharging operations of the storage capacitor. Also it will be evident that the amount by which the storage capacitor is discharged immediately preceding each signal bearing pulse may be varied over relatively wide limits so long as the capacitor is discharged sufficiently each time to follow the modulation envelope of the signal bearing pulses.

From the foregoing, it is evident that the present invention provides a clamping circuit suitable for demodulating an amplitude modulating pulse wave form and wherein a storage capacitor may be quickly charged and discharged in response to charging and discharging pulses and will hold its charge without appreciable leakage during the intervals between pulses. Furthermore, the clamping level to which the storage capacitor is periodically discharged may be maintained at substantially ground potential so that adequate bias may be supplied by a succeeding cathode follower stage without reducing the fidelity of the output wave form.

While there has been described what is at present considered to be the preferred embodiment of the invention, it will be understood that various modifications may be made therein which are within the true spirit and scope of the invention as defined in the appended claims.

What is claimed as new and is desired to be secured by Letters Patent of the United States is:

1. An amplitude modulated signal pulse demodulator circuit, comprising a storage capacitor, first and second electron discharge devices, means connecting the cathode of said first device to the anode of said second device, means connecting said capacitor between the common connection of said devices and ground potential, means connecting the anode of said first device to a potential which is positive with respect to ground, means connecting the cathode of said second device to a potential which is negative with respect to ground, means for applying positive amplitude modulated signal pulses to the control electrode of said first device, thereby to charge said capacitor positively in accordance with the amplitude of said signal pulse, means for applying positive discharging pulses of fixed amplitude to the control electrode of said second device immediately preceding each amplitude modulated signal pulse to cause conduction of said second device and discharge of said capacitor immediately preceding charging thereof in accordance with said signal pulses, a phase inverter including a third electron discharge device having a cathode, a control electrode and an anode, and direct current conductive means for directly connecting the ungrounded side of said capacitor to the control electrode of said third discharge device.

2. An amplitude modulated signal pulse demodulator circuit, comprising a storage capacitor, first and second electron discharge devices, means connecting the cathode of said first device to the anode of said second device, means connecting said capacitor between the common connection of said devices and ground potential, means connecting the anode of said first device to a potential which is positive with respect to ground, means connecting the cathode of said second device to a potential which is negative with respect to ground, means for applying positive amplitude modulated signal pulses to the control electrode of said first device, thereby to charge said capacitor positively in accordance with the amplitude of said signal pulse, means for applying positive discharging pulses of fixed amplitude to the control electrode of said second device immediately preceding each amplitude modulated signal pulse to cause conduction of said second device and discharge of said capacitor immediately preceding charging thereof in accordance with said signal pulses, a third electron discharge device having a cathode, a control electrode and an anode, and direct current conductive means for directly connecting the ungrounded side of said capacitor to the control electrode of said third discharge device.

References Cited in the file of this patent

UNITED STATES PATENTS

| | | |
|---|---|---|
| 2,420,200 | Schoenfeld | May 6, 1947 |
| 2,438,907 | Frankel et al. | Apr. 6, 1948 |
| 2,451,632 | Oliver | Oct. 19, 1948 |
| 2,466,705 | Hoeppner | Apr. 12, 1949 |
| 2,488,567 | Stodola | Nov. 22, 1949 |
| 2,532,338 | Schlesinger | Dec. 5, 1950 |
| 2,568,213 | Bath | Sept. 18, 1951 |
| 2,591,247 | Farnsworth | Apr. 1, 1952 |
| 2,609,533 | Jacobsen | Sept. 2, 1952 |